United States Patent [19]
Okuno

[11] Patent Number: 6,130,997
[45] Date of Patent: *Oct. 10, 2000

[54] CARTRIDGE LOADING APPARATUS FOR A CAMERA

[75] Inventor: Ryoji Okuno, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/900,833

[22] Filed: Jul. 25, 1997

Related U.S. Application Data

[63] Continuation of application No. 08/553,823, Nov. 6, 1995, abandoned, which is a continuation of application No. 08/230,723, Apr. 21, 1994, abandoned.

[30] Foreign Application Priority Data

Apr. 23, 1993 [JP] Japan .................................. 5-119320

[51] Int. Cl.$^7$ .................................................. G03B 17/02
[52] U.S. Cl. .......................................... 396/536; 396/538
[58] Field of Search ..................................... 396/535, 538, 396/536

[56] References Cited

U.S. PATENT DOCUMENTS

| | | | |
|---|---|---|---|
| 4,469,421 | 9/1984 | Kamata | 354/212 |
| 4,834,306 | 5/1989 | Robertson et al. | 242/71.1 |
| 4,982,211 | 1/1991 | Suzuki | 354/173.1 |
| 5,155,514 | 10/1992 | Tamamura | 396/535 |
| 5,159,365 | 10/1992 | Takahashi et al. | 354/275 |
| 5,231,438 | 7/1993 | Smart | 354/281 |
| 5,258,793 | 11/1993 | Tsuji et al. | 354/288 |
| 5,323,201 | 6/1994 | Richiuso et al. | 354/288 |
| 5,440,364 | 8/1995 | Takahashi | 354/173.1 |

FOREIGN PATENT DOCUMENTS

| | | | |
|---|---|---|---|
| 58-107523 | 6/1983 | Japan . | |
| 41621 | 1/1992 | Japan . | |
| 4-80735 | 3/1992 | Japan | G03B 17/28 |
| 470637 | 3/1992 | Japan . | |
| 4215634 | 8/1992 | Japan . | |
| 5100300 | 4/1993 | Japan . | |

*Primary Examiner*—Safet Metjahic
*Assistant Examiner*—Christopher Mahoney
*Attorney, Agent, or Firm*—Fitzpatrick, Cella, Harper & Scinto

[57] ABSTRACT

A film cartridge loading apparatus adapted to a camera, including (a) a slidable cover for film cartridge loading and (b) a motor for driving the cover.

24 Claims, 8 Drawing Sheets

FIG. 8

| A | B | C | Q |
|---|---|---|---|
| 0 | 0 | 0 | 0 |
| 1 | 0 | 0 | 0 |
| 0 | 1 | 0 | 0 |
| 1 | 1 | 0 | 1 |
| 0 | 0 | 1 | 0 |
| 1 | 0 | 1 | 1 |
| 0 | 1 | 1 | 1 |
| 1 | 1 | 1 | 1 |

FIG. 10A1
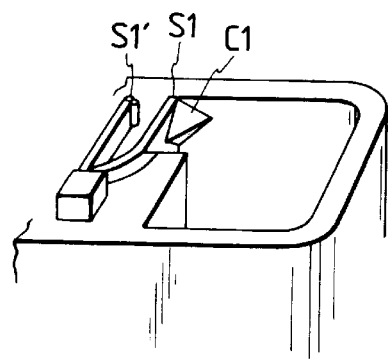
FIG. 10A2
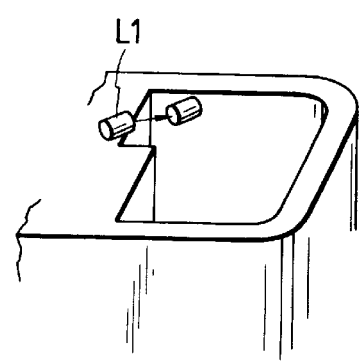
FIG. 10B
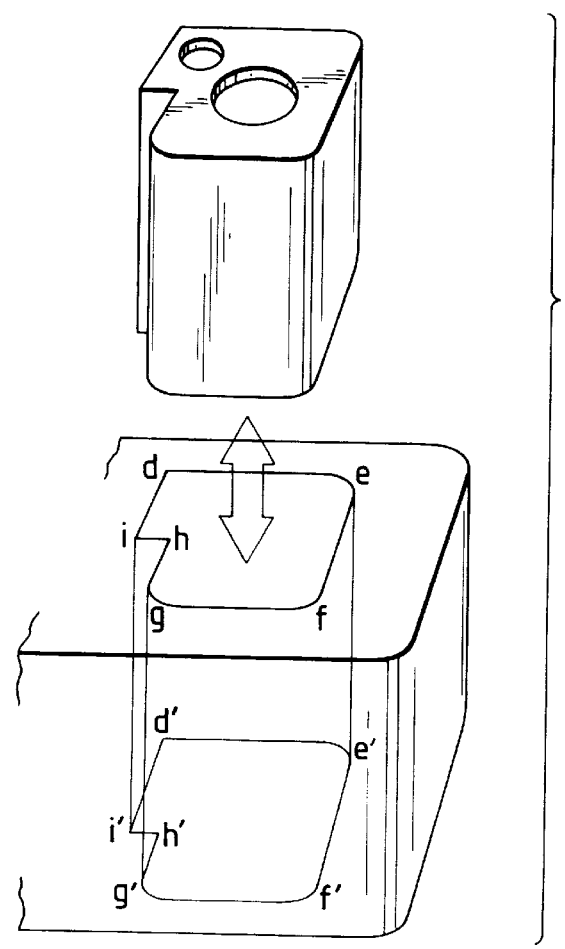

CARTRIDGE LOADING APPARATUS FOR A CAMERA

This application is a continuation of application Ser. No. 08/553,823 filed Nov. 6, 1995, which is a continuation of Ser. No. 08/230,723 filed Apr. 21, 1994, both now abandoned.

BACKGROUND OF THE INVENTION

1. Field of the Invention

The invention relates to an improvement of a film cartridge loading apparatus for a camera.

2. Related Background Art

Up to this time, in film cartridge loading, various improved plans for enhancing performance have been proposed. Recently, for example, there has been proposed a cartridge film called "thrust cartridge. film" as disclosed in U.S. Pat. No. 4,834,306 or the like, wherein the cartridge thrusts a leader portion of the film by a film feeding fork of a camera from the cartridge in which the film is completely stored. By using this kind of cartridge, since the cartridge loading is not required to consider the leader portion of the film in the case of loading the cartridge into a camera, the cartridge can be loaded from the axial direction into a film loading chamber of a camera, that is, drop-in loading can be obtained easily.

However, even in film cartridge loading of this type, a user must operate an opening and closing cover of the cartridge loading chamber, so that there is still room for improvement in cartridge loading.

SUMMARY OF THE INVENTION

One aspect of the present invention is to provide a cartridge loading apparatus for a camera or a camera to improve its performance with a simplified mechanism, the apparatus including a slidable cover for film cartridge loading and a motor for driving the cover.

Another aspect of the present invention is to provide a cartridge loading apparatus for a camera or a camera to further improve its performance, the apparatus including a cover for a film cartridge loading and an automatic drive means for automatically driving the cover in response to the film cartridge approaching the cover.

Another aspect of the present invention is to provide a cartridge loading apparatus for a camera or a camera to further improve its performance, the apparatus including a film cartridge loading portion for loading the film cartridge and a determination means for determining whether or not an object approaching a film cartridge loading portion should be loaded as a film cartridge.

Other aspects of the present invention will be disclosed hereinbelow by taking shape in the preferred concrete embodiments.

BRIEF DESCRIPTION OF THE DRAWINGS

FIG. 8 is a table showing output results to output signals A, B and C;

FIGS. 10A1, 10A2 and 10B are perspective views showing a film cartridge loading portion according to a sixth embodiment of the present invention.

DESCRIPTION OF THE PREFERRED EMBODIMENTS

Referring now to drawings, preferred embodiments according to the present invention will be described hereinbelow.

Figure 1:
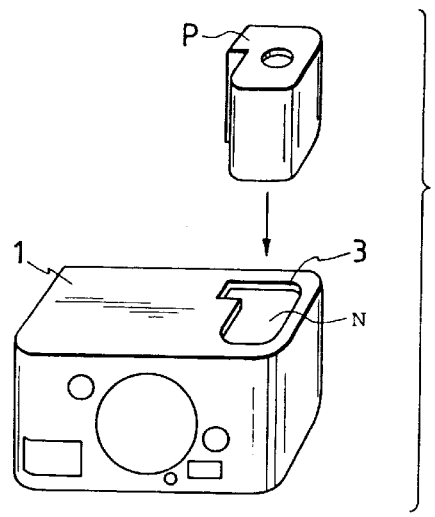
FIG. 1 is a perspective view showing an example of cartridge insertion according to embodiments of the present invention.

FIG. 1 shows one example of inserting (loading) a film cartridge P into a camera to be described later, including a bottom portion 1 of a camera body and a cover 2 of a film cartridge insertion port N. Hereinbelow, corresponding elements in the drawings have the same numerals.

Figure 2B:
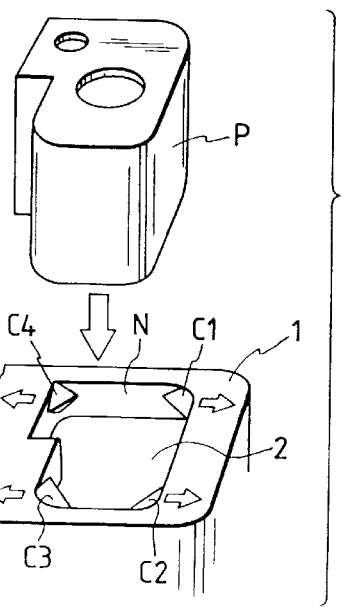
FIGS. 2A and 2B are a plan view and a perspective view showing a film cartridge insertion port according to a first embodiment of the present invention.
Figure 2A:
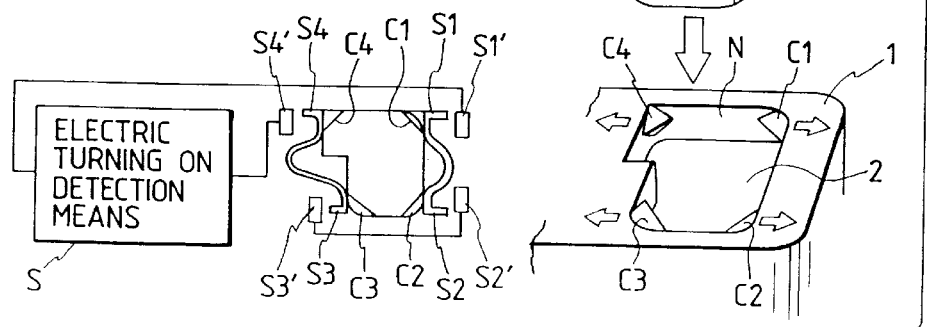

FIGS. 2A and 2B are a plan view and a perspective view showing a film cartridge insertion port according to a first embodiment of the present invention. In the drawing, there are provided pressure switches S1, S1', S2, S2', S3, S3', S4, S4' respectively coupled with each other, covers C1, C2, C3, C4 respectively united with the pressure switches S1, S2, S3, S4, a bottom portion 1 of a camera body, a cover 2 of a film cartridge insertion port N. The cartridge insertion port N takes the form of the substantially same shape as a projection shape of an insertion portion of the film cartridge P. When inserted into the film cartridge insertion port 3, the film cartridge P strikes and contacts with the covers C1, C2, C3, C4. When the cartridge P is further inserted, the covers C1, C2, C3, C4 are forced in the walls of the cartridge insertion port 3 and switch contacts S1, S2, S3, S4, each which is the movable side of pressure switches respectively united with the covers C1, C2, C3, C4, are respectively forced in the directions of the corresponding arrows shown in FIG. 2B, simultaneously striking and contacting with switches S1', S2', S3', S4' assigned as connector sides. At this moment, since a series of switches S1', S2', S3', S4' constitute one circuit, the circuit is electrically conducted by the switches being completely turned ON and determines "cartridge entering" by electricity turning on being detected in an electricity turning on detection means S. The series of switches S1', S2', S3', S4' are separately arranged in portions such as corners of the cartridge insertion port 3, which is made difficult to pressure, in order to prevent unexpectedly and coincidently touching with tips of fingers, nails or other objects. Thus, it can be prevented that objects other than the cartridge are incorrectly determined as "cartridge entering".

Figure 3A:
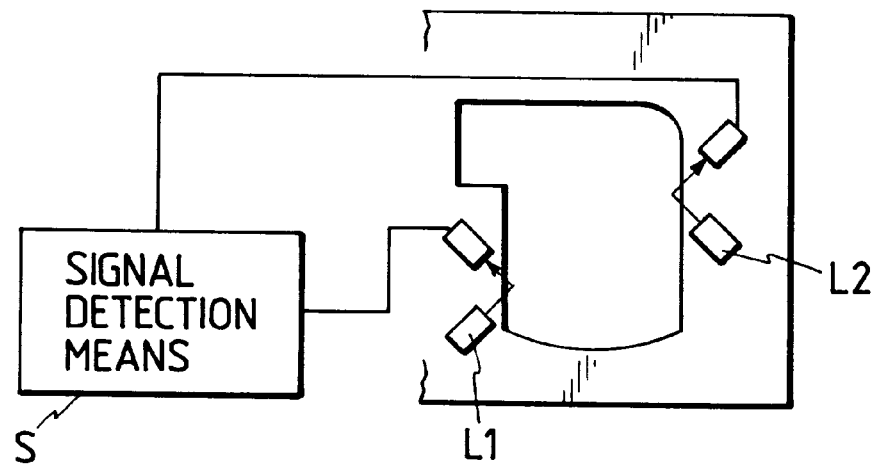
FIGS. 3A and 3B are a plan view and a perspective view showing a film cartridge insertion port according to a second embodiment of the present invention.
Figure 3B:
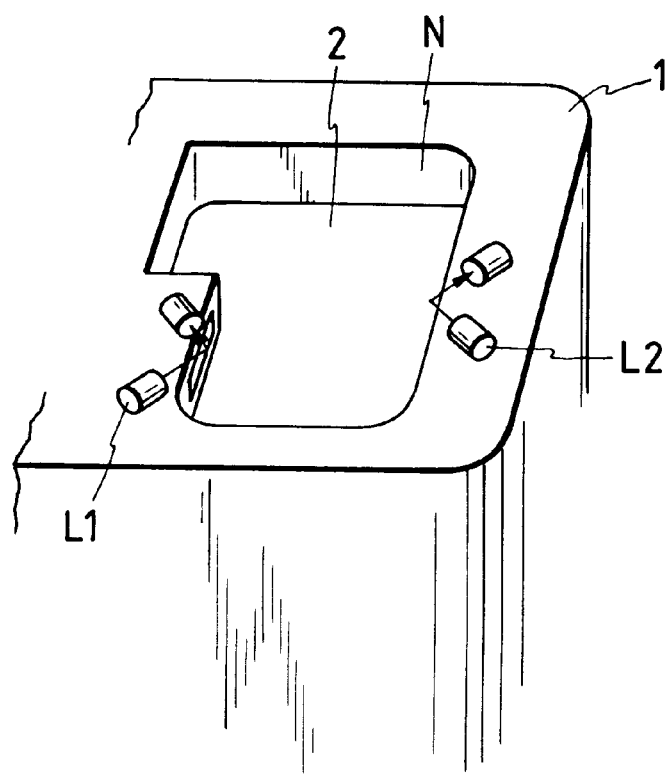

FIGS. 3A and 3B are a plan view and a perspective view showing a film cartridge insertion port according to a second embodiment of the present invention, including simple optical sensors L1 and L2, a bottom portion 1 of a camera body and a cover 2 of a cartridge insertion port N. As shown in FIG. 3B, the optical sensors L1 and L2 are separately provided in internal surfaces of the film cartridge insertion port N, pointing their detection direction inside, in order to determine "cartridge entering" by both detection signals of L1 and L2. Therefore, even if an object other than the cartridge approaches the cartridge insertion port N along the bottom portion 1 of the camera body, it is not detected by the optical sensors L1 and L2. Also, since a plurality of optical sensors are arranged in the internal walls of the cartridge loading portion, those sensors do not determine "cartridge entering" even if one of optical sensor L1 or L2 outputs a detection signal unless the other optical sensor simultaneously outputs the detection signal therewith. Similar to the first embodiment, optical sensors of this embodiment can also prevent careless determination unless the sensors are intentionally touched with tips of fingers, nails or other objects.

Figure 4A:
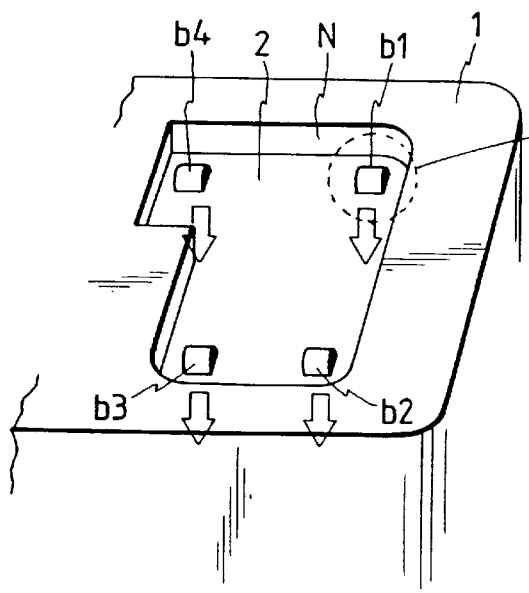
FIGS. 4A and 4B are perspective views showing a film cartridge insertion port and a leaf switch according to a third embodiment of the present invention.
Figure 4B:
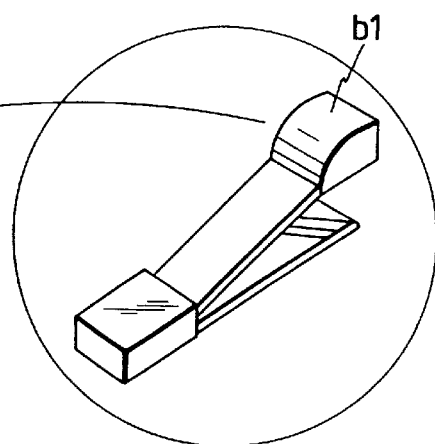

FIGS. 4A and 4B are perspective views showing a film cartridge insertion port according to a third embodiment of the present invention. In the drawing, there are provided leaf switches b1, b2, b3, b4 separately arranged adjacent to internal walls of a cartridge insertion port N and a bottom portion 1 of a camera body. The third embodiment also has the same circuit as those shown in the first and second embodiments, which can determine "cartridge entering" only when switches b1, b2, b3, b4 are simultaneously turned ON, so that the circuit can prevent determining "cartridge entering" when objects other than the cartridge approach the cartridge insertion port N along the bottom portion 1 of the camera body or when any of switches b1, b2, b3, b4 are carelessly pressed.

Figure 5:
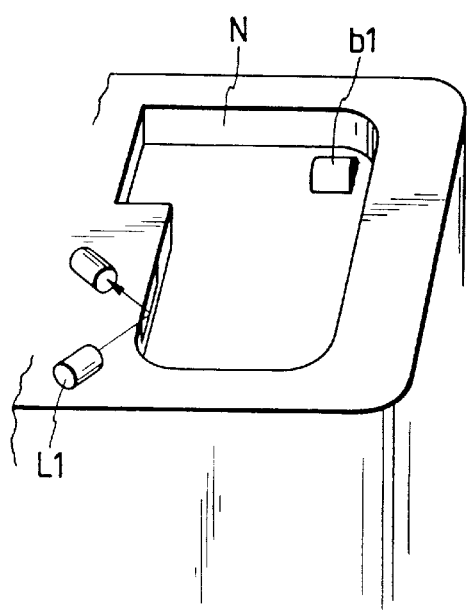
FIG. 5 is a perspective view showing a film cartridge insertion port according to a fourth embodiment of the present invention.

FIG. 5 is a perspective view showing a film cartridge insertion port according to a fourth embodiment of the present invention, including a leaf switch b1, and an optical sensor L1 provided in an internal wall of a film cartridge insertion port N, pointing their detection direction inside of the cartridge insertion port N. In this case, the switch b1 is pressured by an end portion of the film cartridge insertion portion and functions as an optical sensor starting switch by which a standby switch of the optical sensor L1 is turned ON, the optical sensor L1 detects and determines "cartridge entering" by catching a side portion of the cartridge. In other words, "cartridge entering" are determined by both an electricity turning on signal from the leaf switch b1 and a detection signal from the L1 optical sensor so that incorrect determination can be prevented when objects other than the cartridge approach the cartridge insertion port N along the bottom portion 1 of the camera body or when the switch b1 is carelessly pressured in the same way as shown in the above-mentioned embodiments. Also, a regular electricity turning on for the sensor L1 is not required so that it can be operated with economical power consumption.

Figure 6:
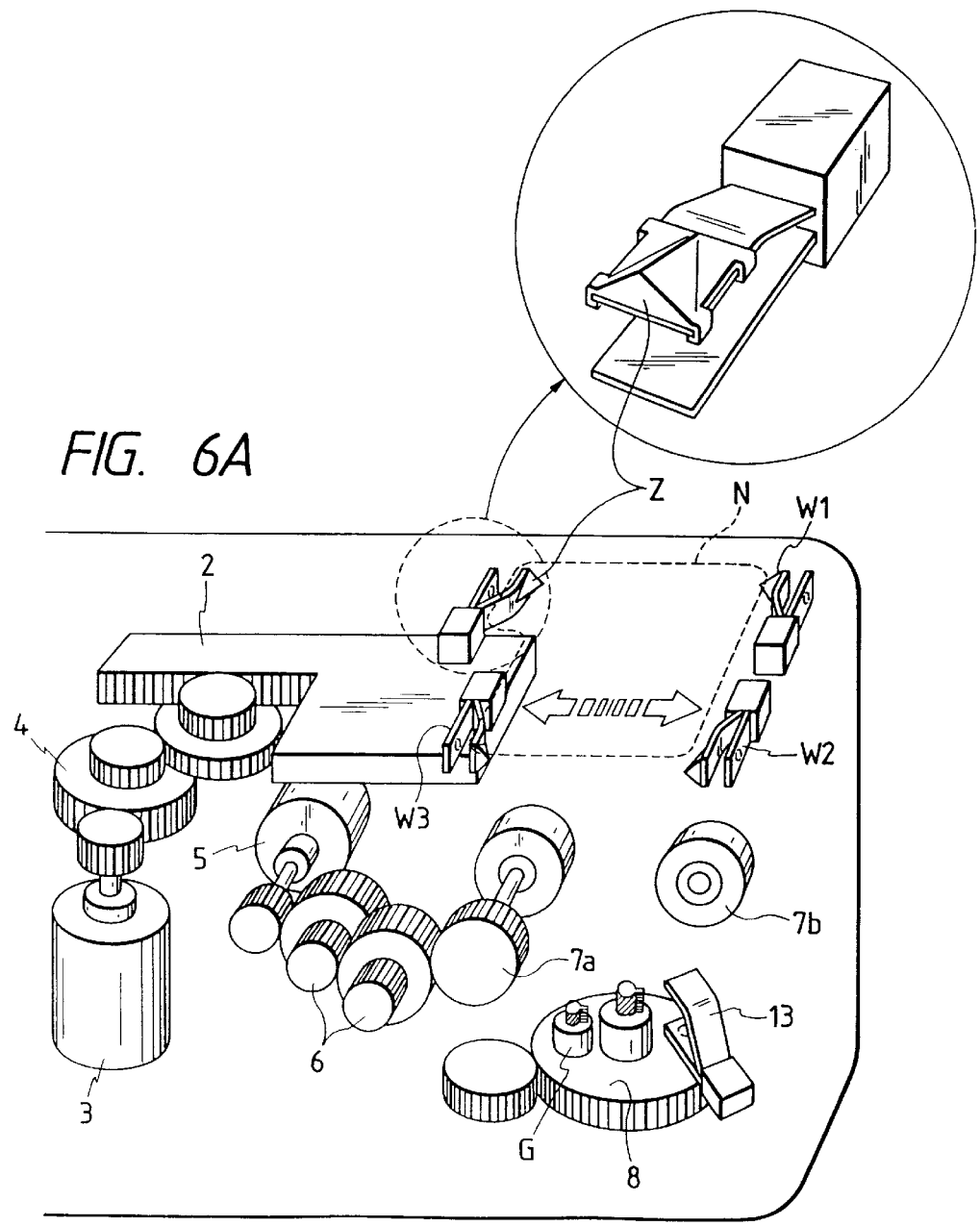
FIGS. 6A and 6B are perspective views showing a film cartridge loading portion according to a fifth embodiment of the present invention.

FIGS. 6A and 6B are perspective views showing a film cartridge insertion port according to a fifth embodiment of the present invention. In the drawings, there are provided a slidable cover 2 of a cartridge insertion port N, an actuator (motor) 3 for opening and closing the cover 2 of the cartridge insertion port N, a train of reduction gears 4 for the cover 2 of the cartridge insertion port N, an actuator 5 (motor) for pulling in and pushing out a cartridge, a reduction gear 6, a cartridge pull-in and push-out roller 7a rotating by power from the actuator 5, a rotatable cartridge pull-in and push-out follower roller 7b, a train of feeding gear 8 which connects with film winding shaft of the cartridge to enable film feeding and film rewinding, a microcomputer starting switch Z, pressure switches w1, w2, w3 for cartridge entering detection provided inside of the film cartridge insertion port N, a cartridge loading completion detection means 13, lever G which inter-locks with an actuator for opening and closing a light shielding cover provided in the film cartridge.

Now, in order to prevent a failure of determination carelessly detecting a cartridge entering, a standard can be established of determining as "cartridge entering" for a camera only when at least two detection results of a cartridge entering detection means detect "entering".

Figure 7:
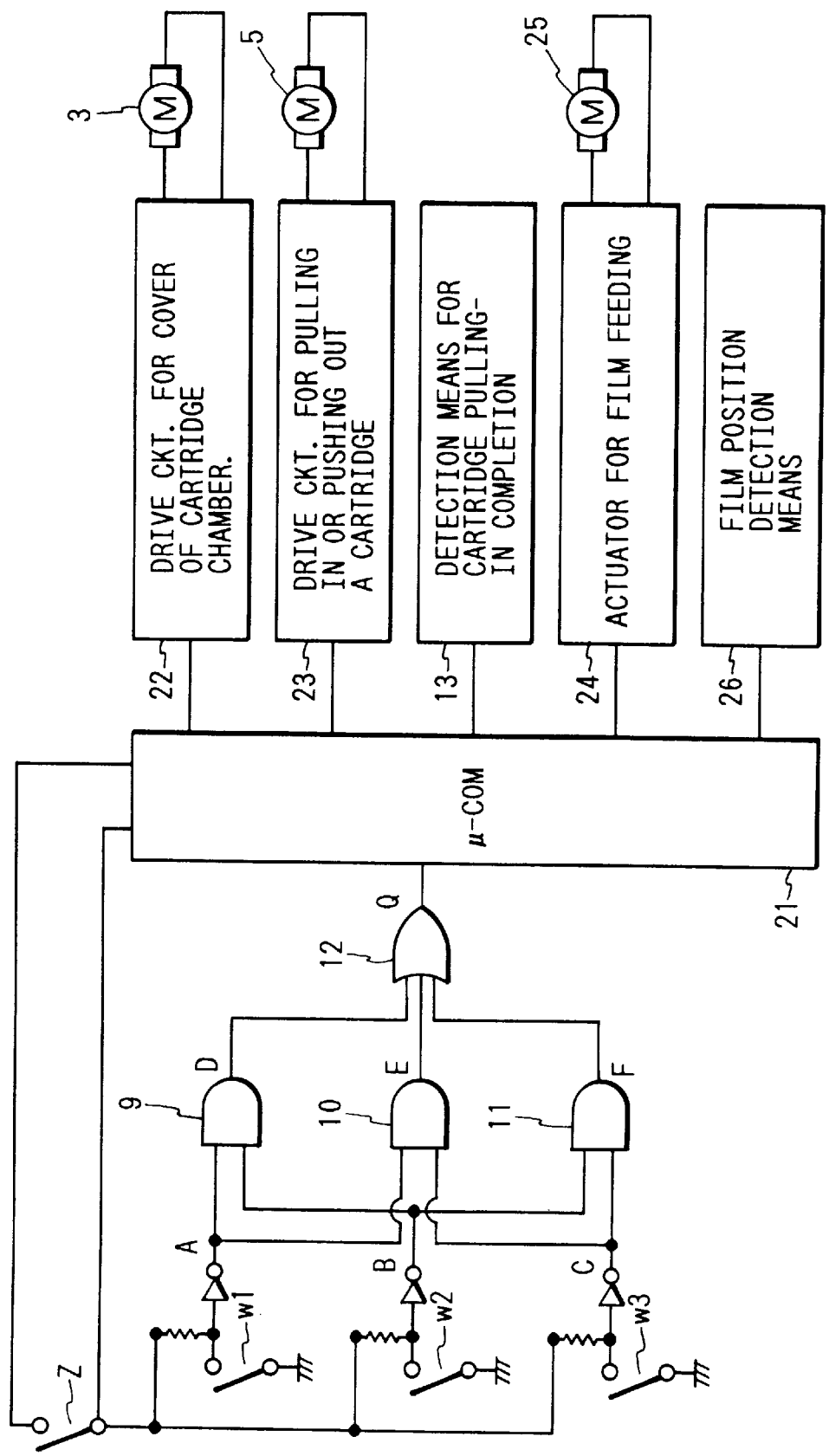
FIG. 7 is a circuit diagram of a cartridge entering detection apparatus, as shown in FIGS. 6A and 6B.

FIG. 7 is a circuit diagram concretely showing such a cartridge entering detection apparatus as fulfills the abovementioned condition shown in FIGS. 6A and 6B according to the fifth embodiment, including the switch Z which starts a microcomputer 21 and sets the other switches w1, w2, w3 in a standby state. Although the switch Z, for example, may be located outside of a cartridge insertion portion by providing an engaging means to the switch Z, it would be better to locate the switch Z inside of the cartridge insertion port as shown in FIGS. 6A and 6B. If so, the switch Z is turned ON by a cartridge end portion inserted into the camera so that the microcomputer can be started without touching a button with a finger or the like. Also, the switches w1, w2, w3 can function as an alternative to the switch Z for starting the microcomputer. The switches w1, w2, w3 respectively output signals 0 in ON state or signals 1 in OFF state, the signals are inverted into 1 in ON state or 0 in OFF state by an inverter and the signals are output as output signals A, B, C. The output signals A, B, C are respectively input to AND circuits 9, 10, 11 and are output as output signals D, E, F having a value of 0 or 1. As a result, when at least one output of the signals D, E, F is 1, the signal is determined as 1 by an OR circuit 12 and only when all the outputs are 0, the signal is determined as 0 by the OR circuit 12, and then the signal is output as output signal Q having a value of 0 or 1. FIG. 8 is a table showing output results of the output signal Q to the output signals A, B, C. When the output signal Q outputs 0, the camera determines "cartridge not entering" and when the output signal Q outputs 1, the camera determines "cartridge entering". Then, results of the output signal Q are input in the. microcomputer 21 and become trigger signals for driving various kinds of actuators and the detection means.

Figure 9:
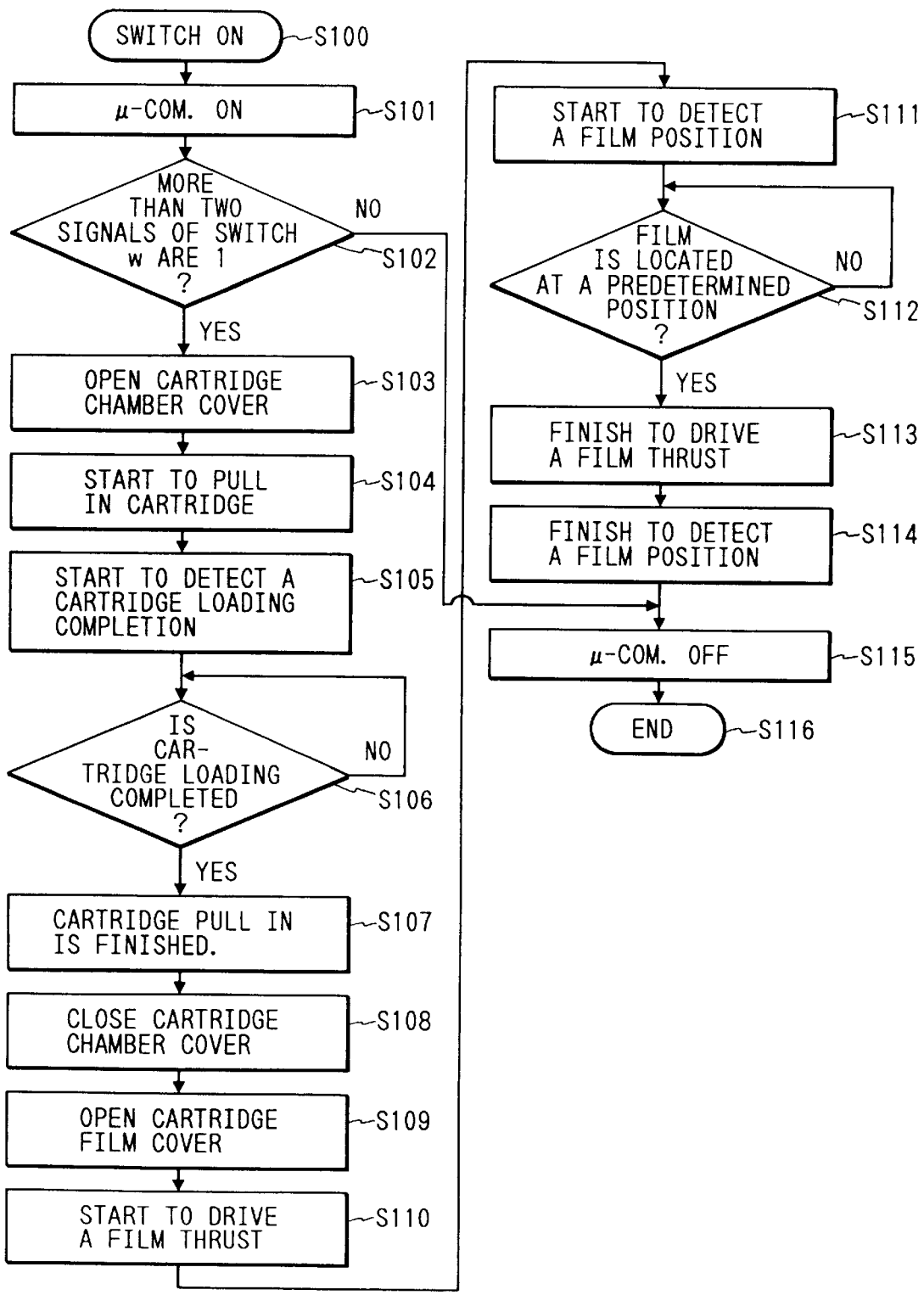
FIG. 9 is a flow chart showing a an operation of a microcomputer, as shown in FIG. 7.

FIG. 9 is a flow chart showing a sequence of the microcomputer 21 shown in FIG. 7. At first, the sequence is started after pressure switch Z is turned ON by inserting an unillustrated cartridge into a camera at step 100.

Then, the microcomputer starts in response to the switch Z being turned ON, simultaneously confirming that the other switches w1, w2, w3 are turned ON at step 102. A method for confirmation is the same as described in FIG. 7. As a result of step 102, when "cartridge entering" is determined, the actuator 3 is driven by a drive circuit 22 for driving a cartridge chamber cover 2 to open the cover 2 at step 103. With respect to opening and closing the cartridge chamber cover, further accurate drive can be obtained by providing a detection means for detecting opening completion or closing completion. After opening of the cartridge chamber cover 2 has been finished, the actuator 5 is driven by drive circuit 23 for pulling in or pushing out a cartridge, the roller 7a made of elastic material is rotated to hold the cartridge between the roller 7a and the movable roller 7b made of elastic material, (FIG. 6A) and the cartridge is automatically fed inside of the cartridge chamber at step 104. When a loading completion is detected by the cartridge loading completion detection means 13 at step 106, a cartridge pull-in operation is finished at step 107, the actuator 3 is conversely electrically conducted by the drive circuit 22 for driving a cartridge chamber cover and the cartridge chamber cover 2 is closed at step 108. After the cartridge chamber has been completely shielded from the outside light, a cartridge film cover is opened by the lever G for opening the light shielding cover provided in the cartridge at step 109, and next, the actuator (motor) 5 is driven by drive circuit 24 for film feeding, the gear 8 for film feeding is rotated, and film is fed from the cartridge at step 110. Then, a film position is detected by a film position detection means 26 provided around the aperture of the camera at step 111, if it is determined that the film is located at a position possible to take a picture at step 112, the film feeding is finished at step 113 and standby state of all circuits is turned OFF at steps 114 and 115. After that, a user of the camera sets the main power ON so that the camera can be turned in a state of taking a picture. In such a series of operations, the user of the camera only inserts the film cartridge into the cartridge insertion port without opening or closing the cartridge chamber cover with his or her hand or without troublesome button operations accompanying insertion of the cartridge, so that it can make the film position possible to take a picture. If step 115 shown in FIG. 9 is omitted and the main power is directed to be ON, it can automatically make a state of the camera possible to take a picture by immediately releasing from the cartridge insertion.

FIGS. 10A1, 10A2 and 10B are perspective views showing a film cartridge loading portion according to a sixth embodiment of the present invention. In the drawings, there are provided a pressure switch cover C1 provided in an internal corner portion of a film cartridge insertion port, a movable side switch S1 united with the cover Cl, a connector S1' coupled with the switch S1, and an optical sensor L1 provided in the internal corner portion of the film cartridge insertion port. In the case of using either one pressure switch or one optical sensor, when the film cartridge enters from the insertion port, "cartridge entering" can be determined by connecting the switch S1 to the connector S1' or by one information detected by the optical sensor. This assumes the case that a plurality of cartridge entering detection means cannot be used for economical reasons or for the reason that area enough for the detection means cannot be obtained around the cartridge loading portion. In this case, in order to obtain the same efficiency as shown in the first, second and third embodiments or the like, one cartridge entering detection means is arranged in an internal corner portion of the film cartridge insertion port difficult to touch with fingers, nails or other objects, so that incorrect determination can be prevented when objects carelessly enter into the cartridge insertion port or when objects other than the cartridge approach the cartridge insertion port along the bottom portion of the camera. In other words, as shown in FIG. 10B, "cartridge entering detection" means is provided at one of the corners of the cartridge loading portion formed by lines dd', ee', ff', gg', ii'. Also, detection of cartridge insertion completion, in order to prevent incorrect detection with fingers or the like, "detection means for cartridge entering completion" is provided at one of corners formed by lines d'e', e'f', f'g', g'h', h'l', i'd' to which an inserted cartridge end portion is struck.

Further, in the present invention, the switch for "cartridge insertion detection" is not limited to the switch of the above embodiments, and a method and a number of the switch can be set, if necessary.

Furthermore, according to the present invention, there can be applied various types of cartridge other than the cartridge shown in the embodiments, cartridges having image recording mediums except film and also, the other cartridges and loading materials other than cartridges.

Furthermore, according to the present invention, there can be applied a single-lens reflex camera, a lens-shutter camera, a video camera and also, an optical apparatus other than camera and other apparatus.

Furthermore, according to the present invention, it is to be understood that the loading direction of the cartridge is not limited to the above-mentioned embodiments.

Furthermore, according to the present invention, there can be provided a combination of each embodiment or these technical elements corresponding to a predetermined requirement.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted to a film cartridge, comprising:
   a cover for fully closing a film cartridge loading chamber;
   a first movement device which automatically moves the film cartridge with respect to said film cartridge loading chamber; and
   a second movement device which automatically moves the cover for fully closing the film cartridge loading chamber.

2. An apparatus according to claim 1, wherein said first movement device comprises a device which performs at least one of loading the film cartridge into and unloading the film cartridge from the film cartridge loading chamber.

3. An apparatus according to claim 1, wherein said first movement device comprises a control device which coordinates an operation of said first movement device with an operation of the cover for the film cartridge loading chamber.

4. An apparatus according to claim 3, further comprising a relating device which relates the operation of said cover for the film cartridge loading chamber to an operation of a film cartridge cover.

5. An apparatus according to claim 1, wherein said first movement device comprises a control device which coordinates an operation of said first movement device with an operation of a film transporting device.

6. An apparatus according to claim 1, further comprising a control device which relates an operation of said first movement device to an operation of a film cartridge cover.

7. A camera comprising:
   a film cartridge loading chamber;
   a cover for fully closing the film cartridge loading chamber;
   a first movement device which automatically moves a film cartridge with respect to said film cartridge loading chamber; and
   a second movement device which automatically moves the cover to fully close the film cartridge loading chamber.

8. A camera according to claim 7, wherein said first movement device comprises a device which performs at least one of loading the film cartridge into and unloading the film cartridge from the film cartridge loading chamber.

9. A camera according to claim 7, wherein said first movement device further comprises a control device which coordinates an operation of said first movement device with an operation of said cover for the film cartridge loading chamber.

10. A camera according to claim 9, further comprising a second relating device which relates the operation of said cover for the film cartridge loading chamber to an operation of a film cartridge cover.

11. A camera according to claim 7, further comprising:

a film transporting device, and wherein said first movement device further comprises a control device which coordinates an operation of said first movement device with an operation of said film transporting device.

12. A camera according to claim 7, further comprising a control device which relates an operation of said first movement device to an operation of a film cartridge cover.

13. An apparatus adapted to use a film cartridge having a film cartridge cover, comprising:

a film cartridge chamber;

a cartridge chamber cover for opening and closing said film cartridge chamber;

an electric motor which drives said cartridge chamber cover;

an actuator which drives the film cartridge cover of the film cartridge loaded in said film cartridge chamber; and a control device which controls operation of said actuator and operation of said electric motor on a time sequenced basis.

14. An apparatus according to claim 13, wherein said control device controls said actuator to open the film cartridge cover after said cartridge chamber cover shields film cartridge chamber from light.

15. An apparatus according to claim 13, further comprising a movement device which moves the film cartridge with respect to said film cartridge chamber, wherein said control device coordinates operation of said actuator and operation of said movement device.

16. An apparatus according to claim 15, wherein said movement device performs at least one of loading the film cartridge into and unloading the film cartridge from said film cartridge chamber.

17. An apparatus according to claim 13, further comprising a film transporting device which transports a film of the film cartridge, wherein said control device coordinates operation of said actuator and operation of said film transporting device.

18. An apparatus according to claim 13, wherein said cartridge chamber cover is at least linearly movable.

19. An apparatus according to claim 13, wherein said apparatus comprises a camera.

20. An apparatus adapted to use a film cartridge having a film cartridge cover, comprising:

a film cartridge chamber;

a movement device which moves the film cartridge with respect to said film cartridge chamber;

an electric motor which drives said movement device;

an actuator which drives the film cartridge cover of the film cartridge loaded in said film cartridge chamber; and a control device which controls operation of said actuator and operation of said movement device on a time sequenced basis.

21. An apparatus according to claim 20, wherein said movement device performs at least one of loading the film cartridge into and unloading the film cartridge from said film cartridge chamber.

22. An apparatus according to claim 21, wherein said control device controls said actuator to open the film cartridge cover after said movement device completes loading the film cartridge into said film cartridge chamber.

23. An apparatus according to claim 20, further comprising a film transporting device which transports a film of the film cartridge, wherein said control device coordinates operation of said actuator and operation of said film transporting device.

24. An apparatus according to claim 20, wherein said apparatus comprises a camera.

* * * * *

UNITED STATES PATENT AND TRADEMARK OFFICE
CERTIFICATE OF CORRECTION

PATENT NO. : 6,130,997
DATED : October 10, 2000
INVENTOR(S): RYOJI OKUNO

It is certified that error appears in the above-identified patent and that said Letters Patent is hereby corrected as shown below:

[56] FOREIGN APPLICATION DOCUMENTS:

"41621" should read --4-1621--.

"470637" should read --4-70637--.

"4215634" should read --4-215634--.

"5100300" should read --5-100300--.

Signed and Sealed this

First Day of May, 2001

Attest:

NICHOLAS P. GODICI

Attesting Officer    Acting Director of the United States Patent and Trademark Office